INVENTOR.
MICHAEL H. ESTKOWSKI
BY Brown, Jackson, Boettcher & Dienner
Attys.

INVENTOR.
MICHAEL H. ESTKOWSKI
BY
Brown, Jackson, Boettcher & Dienner, ATTYS.

Nov. 4, 1969 M. H. ESTKOWSKI 3,476,393

TONE ARM SET-DOWN CONTROL MEANS

Filed Feb. 15, 1966 5 Sheets-Sheet 3

INVENTOR.

MICHAEL H. ESTKOWSKI

BY Brown, Jackson, Boettcher & Dienner

ATTYS.

INVENTOR
MICHAEL H. ESTKOWSKI
BY Brown, Jackson, Boettcher & Dienner
ATTYS.

2.

INVENTOR
MICHAEL H. ESTKOWSKI

BY Brown, Jackson, Boettcher & Dienner
ATTYS.

United States Patent Office 3,476,393

Patented Nov. 4, 1969

3,476,393
TONE ARM SET-DOWN CONTROL MEANS
Michael H. Estkowski, St. Joseph, Mich., assignor to V-M Corporation, Benton Harbor, Mich., a corporation of Michigan Filed Feb. 15, 1966, Ser. No. 527,576
Int. Cl. G11b *15/00, 17/00*
U.S. Cl. 274—10 14 Claims

ABSTRACT OF THE DISCLOSURE

Record changing mechanism for use with a phonograph having a turntable and means for storing and sequentially releasing records to the turntable for reproduction thereof. The record changing mechanism includes a plurality of stop elements movable with a tone arm and effective for selectively positioning the tone arm for proper set-down on a selected one of a plurality of records of different diameters. The mechanism further includes a first arm member responsive to rotation of a record of larger diameter than the selected record when disposed on the turntable for enabling the corresponding stop and effecting proper tone arm set-down, and a second arm member responsive to the lowering of a record of still larger diameter to the turntable for enabling the stop corresponding to such larger diameter record and effecting proper tone arm set-down thereon.

This invention relates to phonographs for reproducing grooved disc records of different diameters dropped from a central spindle onto a rotating turntable, and in which the tone arm is moved from a set-down position, to initiate reproduction of a record, inwardly of the record to an innermost position thereon from which latter position it is moved outward to a record clearing position.

Phonographs of the character above mentioned are well known and extensively used. In such known phonographs the set-down means for adjusting the tone arm is, in general, quite complicated, with corresponding cost of production, and is subject to inaccuracies in determining the set-down positions of the tone arm for records of different diameters.

My invention is directed to tone arm set-down means which is of comparatively simple and inexpensive construction and is accurate in determining the set-down position of the tone arm corresponding to records of different diameters. To that end I provide turntable activated means, in conjunction with record controlled means in which the set-down position is determined by the diameter of a record dropped onto the turntable. More specifically, I provide a plurality of positive stops for limiting movement of the tone arm from its outer record clearing position to an inner set-down position, and means whereby the one of such stops corresponding to the diameter of a record dropped onto the turntable is selected by such record thereby assuring that the set-down position of the tone arm for the record is accurately determined relative to the record dropped onto the turntable. Further objects and advantages of my invention will appear from the detail description.

I have illustrated the tone arm set-down means of my invention, by way of example, as embodied in a phonograph which is, in general, of known construction and operation except as to those features having to do with my invention.

The phonograph comprises a base plate 1, a turntable 2 rotatably mounted on plate 1 and driven in clockwise direction, as viewed from above, by an electric motor (not shown) in a known manner. The turntable 2 rotates about an upwardly extending spindle 3 having means for supporting thereon a stack of records and delivering them one at a time from the bottom of the stack onto the turntable 2.

Figure 9:
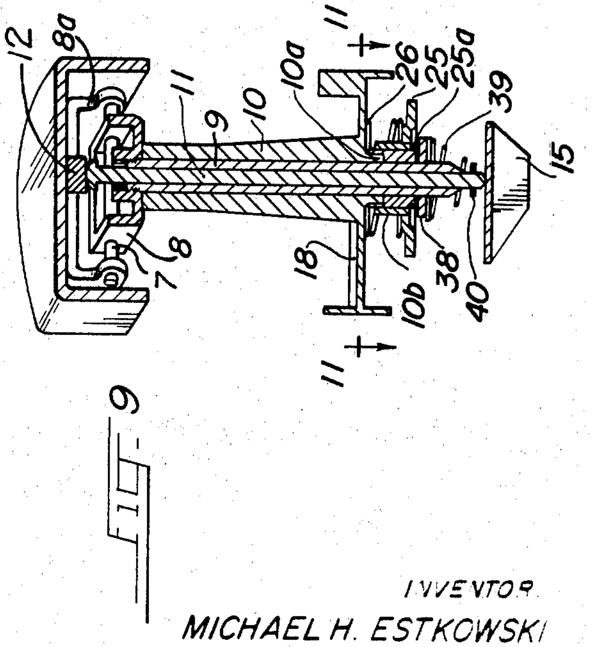
FIGURE 9 is a sectional view taken substantially on line 9—9 of FIGURE 4.
Figure 11:
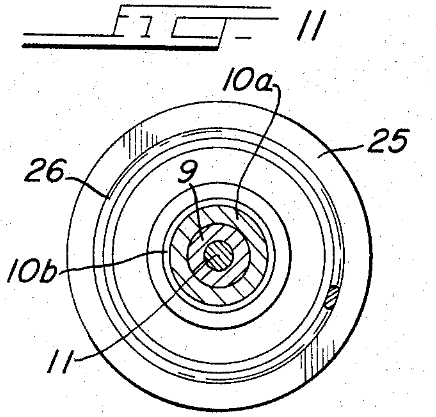
FIGURE 11 is a sectional view taken substantially on line 11—11 of FIGURE 9.

An operating assembly 4 is secured to base plate 1 and underlies the latter and turntable 2. The assembly 4 is disposed with its inner end adjacent spindle 3 and extends outwardly therefrom toward the outer end of a tone arm 5 provided at its inner end with a head 6 carrying a cartridge having a stylus for engagement with the groove of a record to be reproduced as is known. As shown more clearly in FIGURE 9, the outer end of tone arm 5 is pivoted, for movement about a horizontal axis, by a pivot pin 7 inserted through the arms of a first U-shaped bracket 8 fixed on the upper end of a tubular shaft 9 and the arms of a second and inverted U-shaped bracket **8*a* fixed to the underface of tone arm 5 adjacent the outer end thereof. The shaft 9 is spaced a material distance inwardly of tone arm 5 from pivot pin 7 and is rotatably mounted in a verticular tubular post 10 integral with the top plate 18 of assembly 4 and spaced outwardly from turntable 2. Shaft 9** extends downwardly through post 10, a boss 10a extending from the lower end of post 10 and a tubular fitting 10b having a press fit on boss 10a. A lift pin 11 is slidably mounted in shaft 9 and extends above and below the latter. The upper end of pin 11 is disposed to contact an abutment or pad 12 secured to the top wall of tone arm 5 a material distance inwardly thereof from pivot pin 7. Shaft 9 is slidable and rotatable in post 10.

When the lift pin 11 is in its lowered position its lower end seats on the upper face of a downwardly and outwardly inclined cam finger 15 (FIGURES 6 and 7) extending from the outer end of a slide plate 16 underlying and slidably mounted, on top plate 18 of assembly 4, by pin and slot means 17 and two bosses 17a of plate 18 (FIGURE 5), the latter plate being secured to base plate 1. The slide plate 16 is connected at its inner end to a mutilated gear 19 rotatably mounted beneath the top plate 18 on a pin 19a extending through the latter plate. In the retracted position of slide plate 16 a notch 20 (FIGURE 8) in gear 19 is opposed to a spur pinion 21 (FIGURE 4) secured to, conveniently integral with, the lower end of hub 22 of turntable 2. The gear 19 is then out of mesh with pinion 21 and remains stationary with slide plate 16 then in its retracted position shown in FIGURES 6 and 7 and lift pin 11 in its lowered position and seating on the outer end of cam finger 15. Suitable connections, to be more fully explained later, are provided between gear 19 and slide plate 16 whereby the latter is moved to its projected position and returned to its retracted position during one revolution of gear 19 which, as will be understood, is a one revolution gear.

A tone arm locator member or plate 25 (FIGS. 6 to 9 and 11) is pivotally mounted on the fitting 10b. It is restrained against downward movement by a split ring 25a of spring wire engaged in a groove in fitting 10b adjacent the lower end thereof. Plate 25 is urged in clockwise direction, as viewed from above, by a torsion spring 26 one end of which engages an upwardly extending tab 27 at the outer end of plate 25, the other end of spring 26 engaging a boss 28 extending downwardly from top plate 18 of assembly 4. Plate 25 is provided at its inner end an arcuate finger 29, shown more clearly in FIGURES 8 and 12, having an upwardly extending arcuate flange 30. The flange 30 is of stepped formation providing a plurality of shoulders or stop elements 31, 32 and 33. The maximum clockwise movement of plate 25 is limited by an emergency stop member 34 in the form of a boss extending from top plate 18 of assembly 4.

A trip plate 38 (FIGURE 5) is fixed on the lower end of tubular shaft 9, below locator plate 25, and seats upon the upper end of a compression spring 39 of inverted conical form the lower end of which seats on a C-washer 40 engaging a circumferential groove in the lower end of lift pin 11. The locator plate 25 is provided with two openings 41 at opposite sides of shaft 9 and disposed to receive two bosses 42 (FIGURE 12A) of trip plate 38, when the latter is moved to a position at the under face of locator plate 25 and substantially parallel therewith. The trip plate 38 is then latched to the locator plate 25 for turning movement therewith, for a purpose to be explained presently. The trip plate 38 is also provided with a laterally extending finger 43 the function of which will be explained hereinafter.

Figure 8:
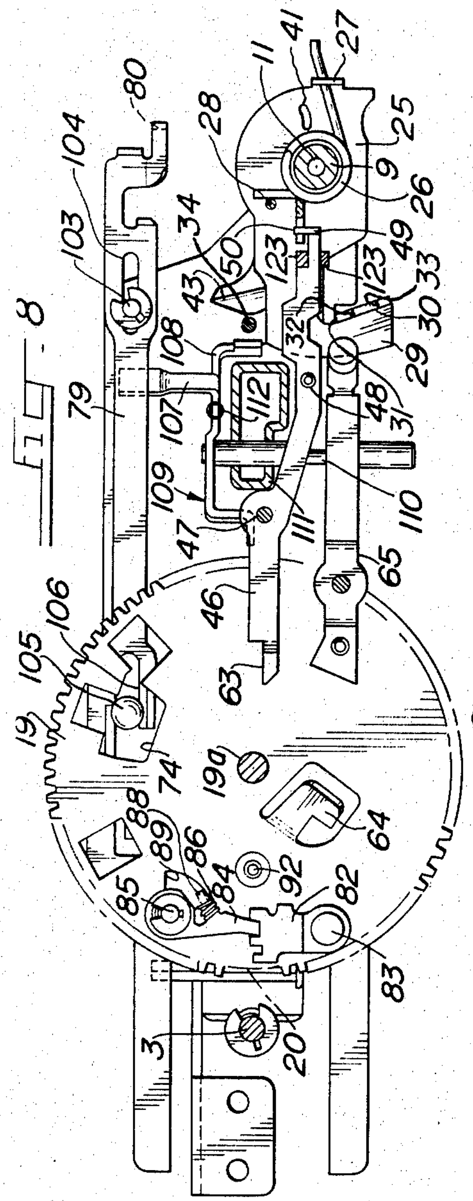
FIGURE 8 is a horizontal sectional view of the assembly of FIGURE 4, taken in a plane adjacent the underface of the top plate of the assembly and looking down, certain parts being omitted for clearness of illustration.

A positioning or reset lever 46, shown more clearly in FIGURE 8, is rockably mounted on a pin 47 extending downwardly from top plate 18 of assembly 4. The outer arm of lever 46 is urged downward by a compression spring 48 and is of reduced width at its outer end and there provided with an upwardly extending finger 49 having at its upper end a tab 50 extending from one side thereof. The outer arm of lever 46 normally is held in raised position by a tab 51 on the outer arm of a bell crank 52 pivoted on the upper face of plate 18 and urged in clockwise direction, as viewed from above, by a torsion spring 53. The plate 18 is provided with an opening 54 (FIGURE 4) which accommodates the finger 49 and a downward extension of tab 51, to be referred to more fully presently. Clockwise movement of bell crank 52 is limited by finger 49 which, when in raised position, is contacted by tab 51.

The tab 51 of bell crank 52 is provided, at its inner edge, with a downward extension 55 disposed in proximity to the inner face of a tab 56 extending upward from the inner end of a finger 57 extending inwardly from the lower end of a substantially vertical lever 58 pivoted at its midlength, at 58a, on one side of post 10. The lever 58 is urged counterclockwise by a torsion spring 59. The lower arm of lever 58 projects through a slot 60 in top plate 18 and normally is held in contact with the outer end wall of slot 60. In the normal position of lever 58 tab 56 thereof underlies tab 50 of lever 46 and tab 51 of bell crank 52, and tab 56 of lever 58 is spaced a short distance outwardly from the downward extension 55 of tab 51. When tab 56 of lever 58 is in its inner position clockwise movement of bell crank 52 is limited by contact of extension 55 of tab 51 with tab 56 of lever 58, as will appear more fully later.

The positioning lever 46 extends inwardly over gear 19 (FIGURES 6, 7 and 8) and is provided at its inner end with a laterally extending inclined tab 63 disposed to be contacted by a cam element 64 of gear 19 in the turning movement thereof, effective for raising the outer end of lever 46 from a lowered position to its normal raised position. An auxiliary lever 65, comprising an outer U-shaped portion and an inner inverted U-shaped portion, joined by a common arm 67, is loosely pivoted at 68 a short distance inwardly of arm 67, on top plate 18 of assembly 4 at the under face thereof. The pointed inner end of lever 65 normally is held in pressure contact with the upper face of gear 19 by a compression spring 69 disposed a short distance inwardly from pivot 68 and confined between plate 18 and the bight portion or upper arm of the inner portion of lever 65. Outer arm 70 of lever 65 extends upwardly through an opening 71 in plate 18 and a corresponding aligned opening 72 in base plate 1. A button 73 of rubber or other suitable soft material is secured on the upper end of arm 70. The outer end of lever 65 normally is held depressed by contact of the inner end thereof with the upper face of gear 19, with button 73 then disposed below the upper surface of turntable 2. Following delivery of a record to turntable 2 the pointed inner end of lever 65 passes downwardly through an opening 74 in gear 19 and the outer end of auxiliary lever 65 is then raised by compression spring 69, thereby moving button 73 to an upper position above the top surface of turntable 2. The button 73 is spaced outward from turntable 2 a distance such that it will not be contacted by a record of small diameter, seven inches for example, but will be contacted by a record of larger diameter, ten inches for example. It may be assumed, for purposes of description, that the tone arm set down means of my invention is intended for use with records seven inches, ten inches, and twelve inches in diameter. The lever 58 is provided at its upper end with a substantially triangular head 75 (FIGURE 6) projecting therefrom inwardly toward the turntable and having a downwardly and inwardly inclined inner edge or surface 76. Lever 58 is spaced from the turntable 2 a distance such that a twelve inch diameter record delivered to the turntable will contact the inclined surface 76 of head 75 thereof adjacent the upper end thereof, thereby turning lever 58 a corresponding distance in clockwise direction.

A trip bar 79 (FIGURES 4, 7 and 8) is slidably mounted on the upper face of slide plate 16, by pin and slot means, at the side thereof remote from cam finger 15 and substantially parallel with slide plate 16. Bar 79 is provided at its outer end with a downwardly extending tab 80 and at its inner end with an upwardly extending tab 81. When the tone arm 5 is swung from an outer position to an inner position and set down on a record to initiate reproduction thereof, the trip plate 38 is unlatched from locator plate 25 and is then free to turn with shaft 9 as the inner end of tone arm 5 is moved inwardly over the record by the stylus following the spiral groove of the record, as is known. When the stylus enters the lead out portion of the record groove the inward travel of the tone arm is accelerated. When that occurs finger 43 of trip plate 38 contacts tab 80 of trip bar 79 and moves the latter outward.

Figures 6, 7:
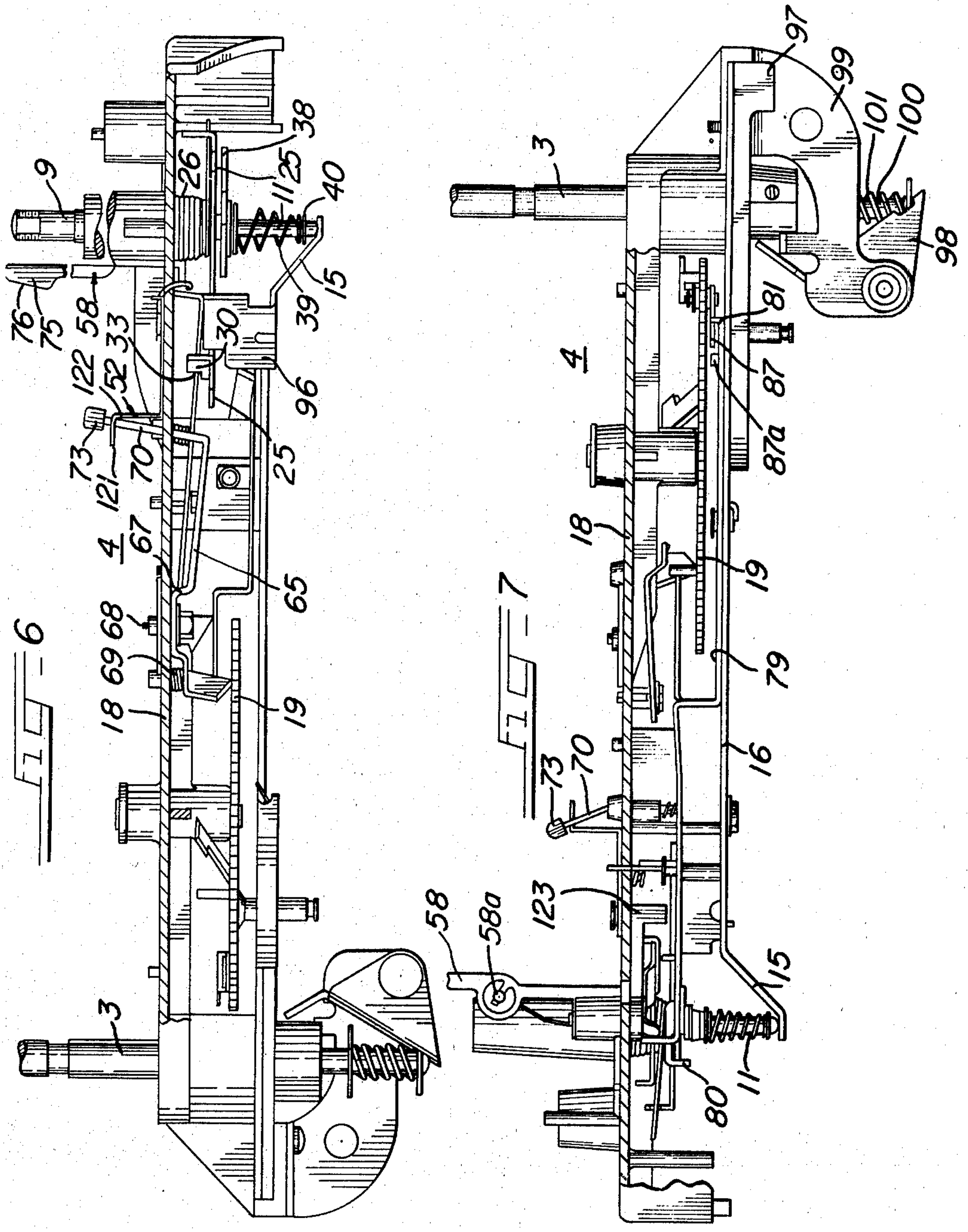
FIGURE 6 is a side view, partly broken away and in section of the assembly of FIGURE 4.
FIGURE 7 is a view similar to FIGURE 6, but taken from the opposite side.

A pawl 82 (FIGURES 5 and 8) is pivoted on a headed pivot pin 83 secured through gear 19, adjacent the notch or cutout 20 therein. The pawl 82 normally is held in a retracted position, as will be explained presently, in which it clears notch 20 and the pinion 21. The pawl is slotted and receives the free end portion of a shift finger 84 pivoted on the upper end of a pin 85 extending through gear 19. A light compression spring 86 is mounted on a tang of finger 84. A trip finger 87 is pivoted on the lower end of pin 85, beneath gear 19, and is provided with a tab 88 extending upwardly through an opening 89 in gear 19 and in proximity to the free end of compression spring 86. When the gear 19 is in its normal stationary position, the trip finger 87 is spaced a short distance outward from tab 81 of trip bar 79 and in the path of travel of tab 81 (FIGURE 7). As trip bar 79 approaches the limit of its outward movement, tab 81 thereof picks up trip finger 87 and turns it clockwise, as viewed from above, thereby moving tab 88 into contact with the free end of compression spring 86. In the continued turning of finger 87 spring 86 is compressed and is effective for turning shift finger 84 clockwise and thereby turning the pawl 82 counterclockwise to a position projecting outwardly of notch 20 into the path of rotation of the pinion 21. The latter then contacts pawl 82 and turns gear 19 counterclockwise a short distance, sufficient to assure meshing of gear 19 with pinion 21, the latter then becoming effective for turning gear 19 counterclockwise through one complete revolution thereof.

The slide plate 16 is provided, adjacent its inner end with a transverse slot 91 (FIGURE 5) which receives a pin 92 secured in gear 19, adjacent pawl 82, and extending downwardly therefrom. A torsion spring 93 is mounted about a headed pin 94, at the under face of slide plate 16, and has a short arm anchored against a flange 95 of plate 16, and has a short arm anchored against a flange 95 of plate 16 and a longer arm in pressure contact with pin 92. The longer arm of spring 93 substantially parallels slot 91 for approximately one-half of its length and is then bent inward at an angle, as shown.

As will be understood from what has been said, and as will be explained more fully later, the locator plate 25 turns with the trip plate 38 a distance determined by the positioning lever 46 corresponding to the desired set-down position of the tone arm, at which time trip plate 38 is unlatched from plate 25 and continues turning with tubular shaft 9. In the rotation of gear 19 clockwise, as viewed in FIGURE 5, the slide plate 16 is moved outward by pin 92 then moving toward the upper end of slot 91. As plate 16 moves outward cam finger 15 thereof raises lift pin 11 thereby raising tone arm 5 from the record. In the continued outward travel of plate 16, the lower end of lift pin 11 seats on plate 16, and an angle finger 96 (FIGURE 6), extending upward from the edge of plate 16, adjacent the inner end of cam finger 15, picks up the plate 38 and turns it to position substantially parallel with plate 25, to which plate 38 is then latched. The tubular shaft 9 turns with plate 38 thereby swinging arm 5 to its outer position beyond any record which may be on the turntable 2. Immediately thereafter a trip finger 97 at the inner end of slide plate 16 activates a stirrup 98 pivoted on a bracket 99 secured to a boss at the inner end of top plate 18 of assembly 4. The bracket lifts a rod 100 slidable in spindle 3 and normally held in lowered position by a compression spring 101. Raising of rod 100 actuates a record support member 102 pivoted in spindle 3 for supporting a stack of records thereof. Actuation of member 102 releases the bottom record of the stack, which drops onto the turntable 2. The slide plate 16 continues to move outward a short distance and finger 96 thereof picks up plate 25 and turns it, with plate 38 a slight distance counter clockwise, as viewed from above, slide plate 16 being then at the limit of its outward travel.

Figures 4, 5:
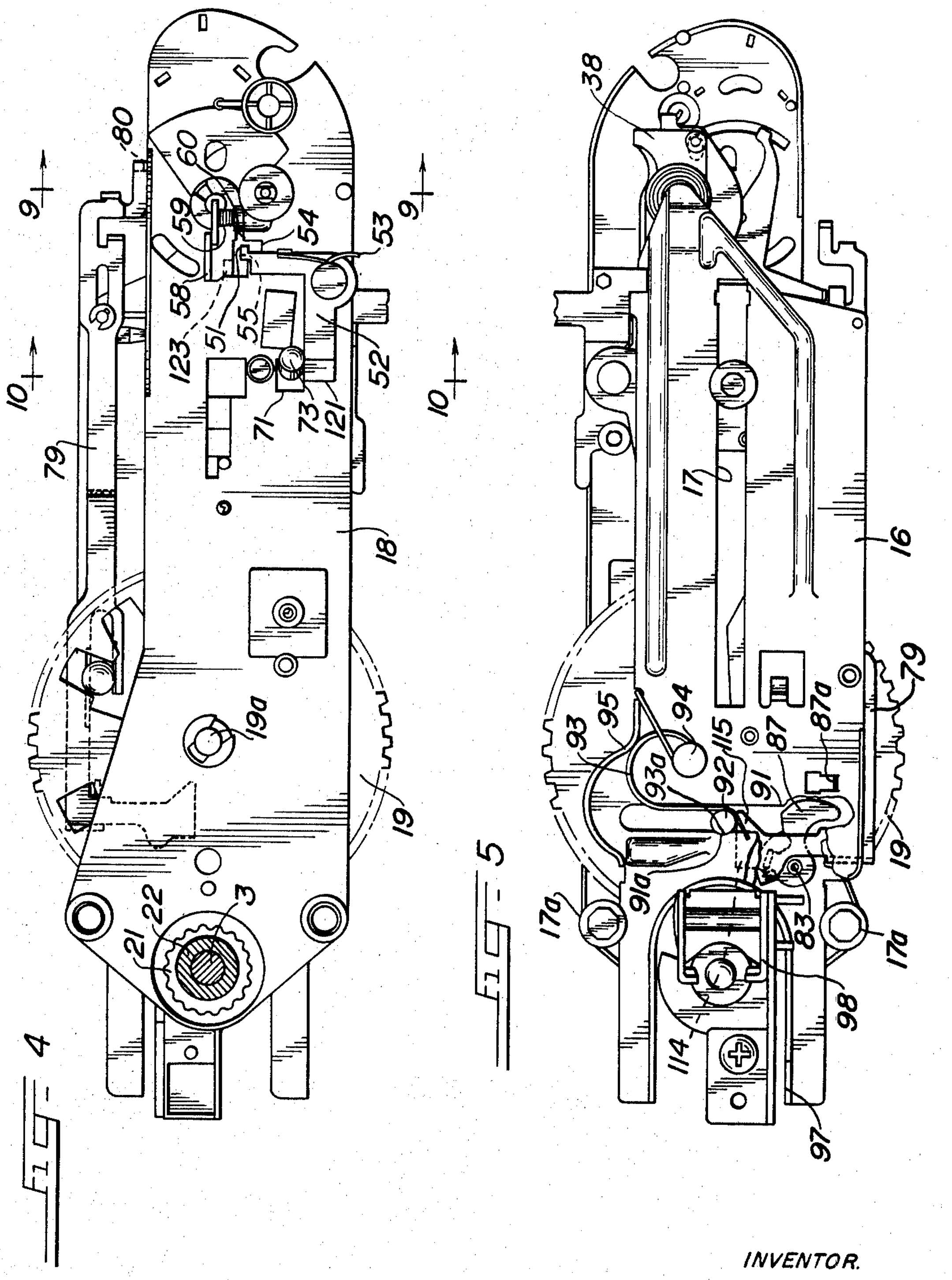
FIGURE 4 is a top plan view of the assembly of FIGURES 2 and 3.
FIGURE 5 is an underneath view of the assembly of FIGURE 4.

When the gear 19 has been turned one-half of a revolution, the pin 92 is at the midlength of slot 91 and in the angle of the longer arm of torsion spring 93, as shown in FIGURE 5. In the continued turning of gear 19 slide plate 16 is moved inward thereby releasing the plates 25 and 38 for turning movement as a unit by torsion spring 26, plate 38 being then latched to plate 25, as previously noted. That turns tubular shaft 9 in clockwise direction, as viewed from above, thereby swinging the pick up or tone arm 5 from its outer position inward to set down position, as determined by the extent of turning of plate 25. In the inward travel of slide plate 16 pin 92 travels toward the lower end of slot 91 placing torsion spring 93 under increasing tension and then travels toward the upper end of slot 91. When the lower end of lift pin 11 is at approximately the midlength of cam finger 15, pin 92 enters the V-angle of spring 93 which, being then under substantial tension, acts to complete turning of the gear 19 with a snap action. That quickly lowers lift pin 11 and with it the tone arm onto the record in the proper setdown position determined by the extent of turning of the locator plate 25. Shortly before pin 92 enters the V-angle of spring 93 trip finger 87 contacts a tab 87*a* extending upward from slide plate 16, a short distance from the inner end thereof and adjacent the trip bar 79. That is effective for moving the pawl 82 to its retracted position, clear of notch 20 of gear 19, in which it remains until again moved to projected position by the outward movement of trip bar 79 as previously explained.

Referring further to the trip bar 79 the pin and slot connections thereof to the slide plate 16 comprise a first pin 103 secured in plate 16 and extending through a slot 104 in the upwardly off set position of bar 79, and a second pin 105 secured in plate 16 and extending through a slot 106 in the inner end portion of bar 79, as shown more clearly in FIGURE 8. The maximum outward movement of bar 79 relative to slide plate 16 is determined by a finger 107 extending outward from arm 108 of a stop lever 109 pivoted on the inner end of a pin 110. The pin 110 extends through a boss 111 projecting downward from top plate 18 of assembly 4 and is suitably anchored at its outer end to the side of that plate. The arm 108 of lever 109 is held in contact with the upper face of slide plate 16 by a compression spring 112 confined between arm 108 and top plate 18. When the trip bar 79 has been moved to its outer position by trip plate 38, as previously described, pin 103 is disposed adjacent the inner end of slot 104, pin 105 is spaced from the outer end of slot 106 and arm 107 of stop lever 109 is disposed adjacent the shoulder connecting the inner and outer portions of bar 79.

When the gear 19 has turned approximately three-quarters of a revolution the trip bar 79 is in its outer position, with an inwardly extending finger 114 disposed at the inner edge of slot 91 (FIGURE 5), and pin 92 is at the lower end of slot 91, effective for moving the slide plate 16 inward. In the continued turning of gear 19 pin 92 contacts finger 114 and moves the trip bar 79 inward a short distance with slide plate 16. The revolution of gear 19 is then completed with a snap action, as previously explained. When that occurs pin 92 contacrs the beveled tip 115 of finger 114 thereby moving trip bar 79 inward relative to plate 16, to its normal inner position, and then passes beyond tip 115 leaving bar 79 free for outward movement relative to plate 16, as previously described. The pin 92 is then at the midlength of slot 92 and is held seated by spring 93 in a shallow V-shaped notch 93*a* at the inner edge of slot 91, effective for preventing over-running of gear 19.

Figure 12:
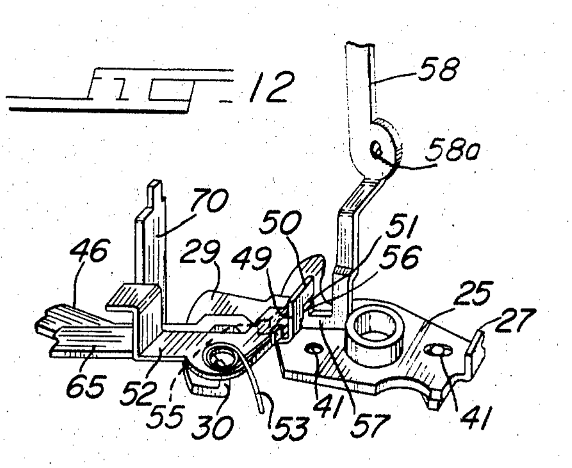
FIGURE 12 is a detail view of the locator plate and reset lever and associated parts in their normal positions; with the operating gear omitted.
Figure 13:
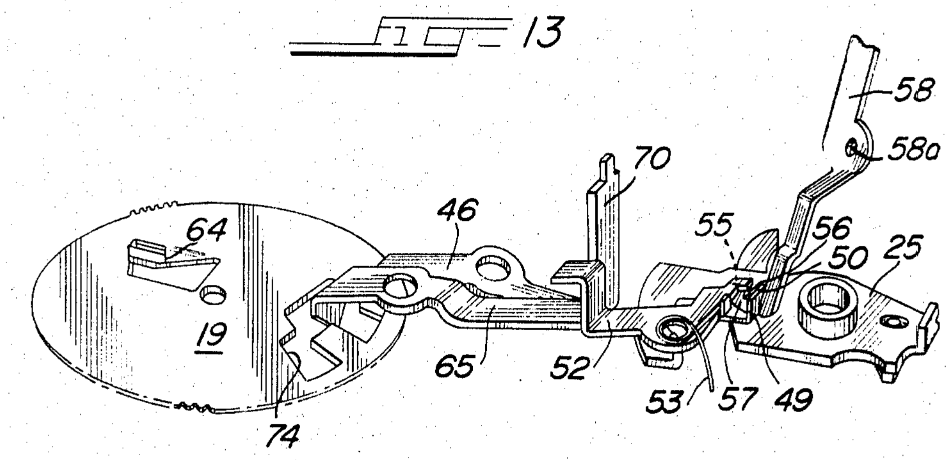
FIGURE 13 is a view similar to FIGURE 12 but including the operating gear, with the locator plate in its outermost position for setting the tone arm down on a record of maximum diameter.
Figure 14:
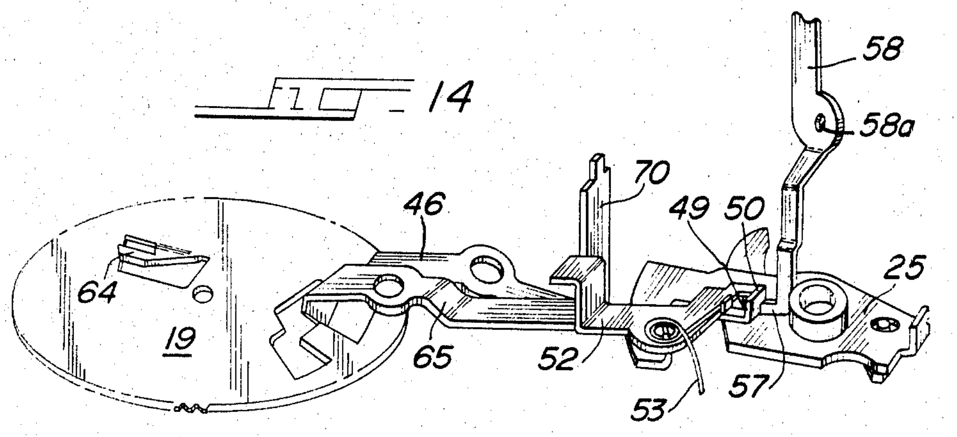
FIGURE 14 is a view similar to FIGURE 13 but with the locator plate in an intermediate position for setting the tone arm down on a record of intermediate diameter.

Referring to FIGURES 12 to 14, the outer arm of positioning lever 46 normally is held raised by the bell crank 52, as explained above, with tab 56 of lever 58 underlying tab 50 of lever 46 and tab 51 of bell crank 52, tab 56 of lever 58 being then spaced a short distance outwardly from the downward extension 55 of tab 51 (FIGURE 12). Assuming a stack of records of 12" diameter to be supported upon the spindle 3 operation may be initiated by lifting the tone arm 5 from its rest and swinging it inward to the central area of the then rotating turntable 2, and then returning the tone arm to its outer position upon the rest. That is effective for projecting pawl 82 and starting rotation of gear 19. As gear 19 rotates the slide plate 16 moves outward, thereby raising the tone arm 5 and turning trip plate 38 into parallelism with positioning plate 25, to which plate 38 is then latched, both plates being then turned together a short distance clockwise, as viewed from above, in the continued outward travel of plate 16. As plate 16 reaches the limit of its out travel, the bottom record of the stack is released and drops onto the turntable 2. As the record drops onto the turntable 2 it rocks lever 58 clockwise, tab 56 displaces element 55 inward thereby releasing the outer end of positioning lever 46. The outer end of lever 46 drops downward and tab 50 of finger 49 then seats on finger 57 of lever 58 between the lower end portion of the stem of lever 58 and tab 56 of finger 57. The outer end of lever 46 is then in its lowermost position and is disposed to be contacted by the innermost shoulder 31, which may be termed the 12" shoulder, of flange 30 of finger 29 of the locator plate 25. When the slide plate 16 moves inward, in the continued turning of gear 19, positioning plate 25 is turned by torsion spring 26 to position with shoulder 31 thereof in contact with positioning lever 46, carrying with it trip plate 38, then latched to plate 25. The parts are then in the positions shown in FIGURE 13 and the tone arm 5 has been raised and swung inward to proper position to be set-down upon the 12" record. In the continued inward travel of slide plate 16, trip plate 38 is released from positioning plate 25, the tone arm 5 is set down on the record, trip bar 79 is returned to its inner position and the one revolution of gear 19 is completed. The tone arm is then moved inward over the record, the trip bar 79 is moved outward, gear 19 is again turned through one revolution and the tone arm 5 is raised and swung to its outer position, completing one cycle of operation.

Figure 10:
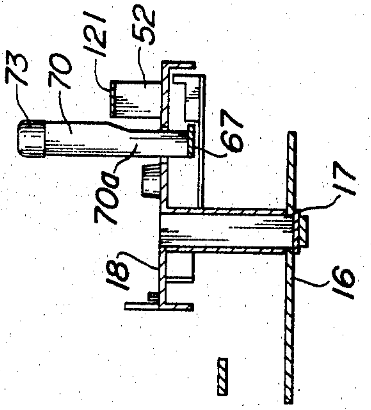
FIGURE 10 is a sectional view, taken substantially on line 10—10 of FIGURE 4, with certain parts omitted for clearness of illustration.

The auxiliary lever 65 normally is held with its outer arm 70 depressed by contact of the pointed element of its inner arm with the upper face of gear 19. The opening 74 in gear 19 is so disposed that the outer arm 70 of lever 65 is not raised until after a record has been dropped onto the turntable 2. Arm 70 of lever 65 is of uniform width for the major portion of its length, approximately the same as that of opening 71, and is disposed in proximity to a finger 121 extending inwardly from vertical arm 122 of bell crank 52. The lower portion 70*a* (FIGURE 10) of arm 70 is reduced in width from its outer edge, and is disposed below top plate 18 in the normal position of lever 65.

It should here be noted that when shoulder 31 of flange 30 is in contact with positioning lever 46 the latter is subjected to substantial transverse pressure thereby due to the turning effect exerted by torsion spring 26 on positioning plate 25. Likewise, when either shoulder 32 or 33 of flange 30 is in contact with lever 46 it is subjected to substantial transverse pressure. Such pressure on the outer end of lever 46 is resisted by one of two fingers 123 extending downward from top plate 18 and spaced a short distance inward from finger 49 of positioning lever 46. The fingers 123 receive snugly, but not tightly, between them a short portion or neck of lever 46 extending from the lower end of finger 49, as shown in FIGURE 8. The fingers 123 are of such length as to receive between them the neck of lever 46 in all of the several vertical positions thereof and function to guide the lever, the inner one of the fingers 123 also serving to resist the transverse pressure to which the outer portion of lever 46 is subjected, as will be understood.

Figures 1, 2, 3, 12A, 13A, 14A:
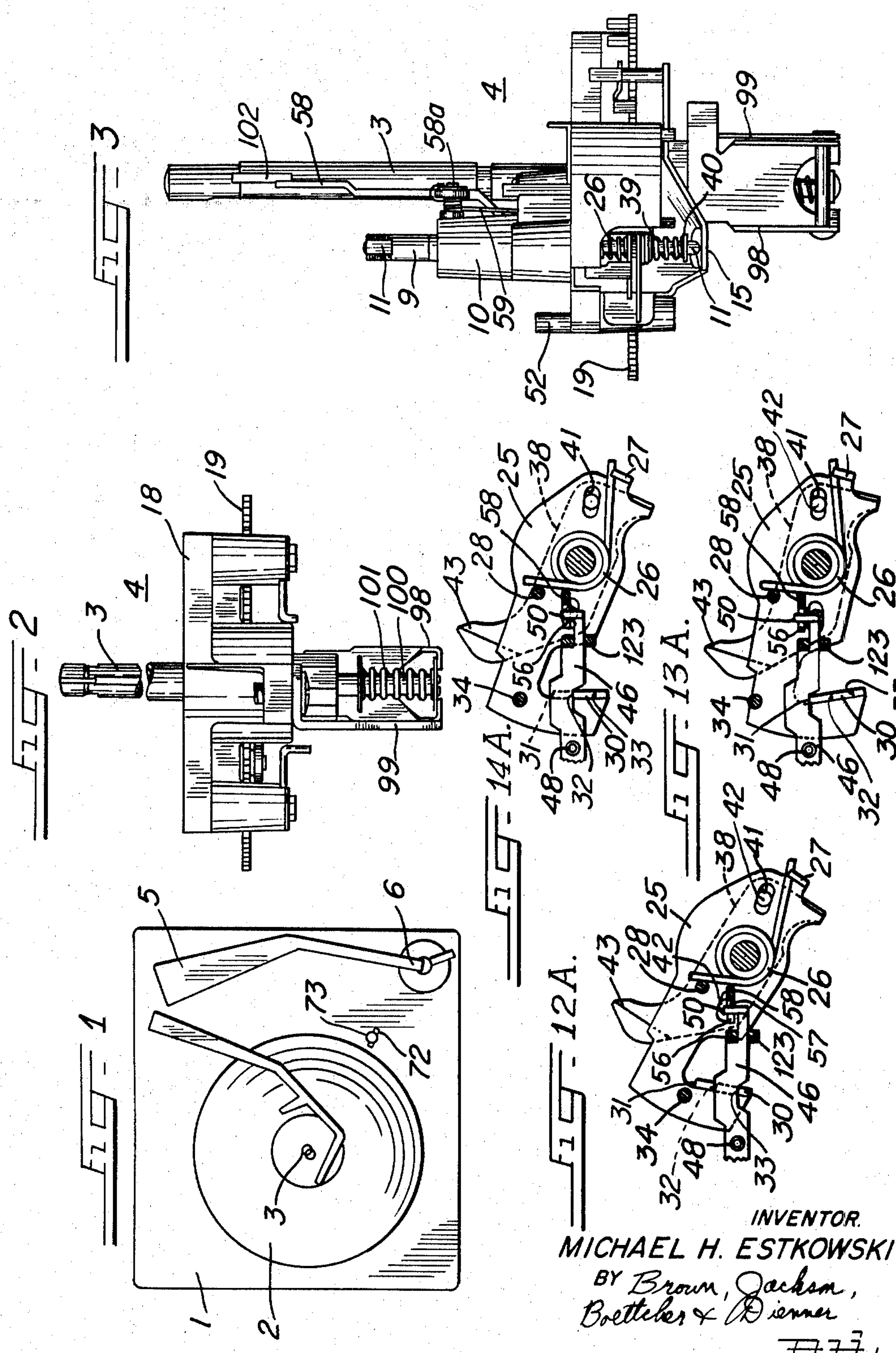
FIGURE 1 is a semi-diagrammatic view of a phonograph base plate and turntable assembly embodying the tone arm set-down means of my invention.
FIGURE 2 is an inner end view of the tone arm operating assembly and associate parts embodying my invention.
FIGURE 3 is an outer end view of the assembly of FIGURE 2.
FIGURE 12A is a plan view of the locator plate and the reset and maximum diameter levers, with the last mentioned shown in section, in their normal positions of FIGURE 12, other parts shown in FIGURE 12 being omitted.
FIGURE 13A is a view similar to FIGURE 12A but with the parts shown in their positions of FIGURE 13.
FIGURE 14A is a view similar to FIGURE 12A but with the parts shown in their positions of FIGURE 14.

When it is desired to reproduce 10" records a stack thereof is placed upon the spindle, with the parts in their normal positions shown in FIGURE 12. Rotation of gear 19 is initiated and the slide plate moves outwardly, effective for raising the tone arm 5 and swinging it to its outer position. As plate 16 approaches the limit of its outward travel, the bottom record of the stack is dropped onto the turntable 2 and overlies button 73 of lever 65, as previously noted. Shortly thereafter, slide plate 16 starts to move inward and the pointed inner end of lever 65 enters opening 74 of gear 19, finger 96 of plate 16 being then in position restraining plates 25 and 38 against turning movement. Entry of the inner end of lever 65 into opening 74 permits upward movement of arm 70 thereof to a position with its lower portion 70*a* of reduced width extending through opening 71 (FIGURE 10) and with button 73 in pressure contact with the underface of the record, the latter then rotating clockwise, as viewed from above, with the turntable. The rotating record drags arm 70 of lever 65 toward the adjacent side of top plate 18 in contact with finger 121 of bell crank 52. That is effective for turning the bell crank counterclockwise a short distance, thereby releasing the finger 49 of positioning lever 46. The outer end of lever 46 then drops down onto the upper end of tab 56 of finger 57 of lever 58. Lever 46 is then disposed to be contacted by the second or ten inch shoulder 32 of flange 30, as shown in FIGURE 14A. The slide plate 16 then continues its inward movement, arm 70 of lever 65 is depressed by gear 19, and the tone arm is swung inward and set down in proper position on the 10" record. In the continued rotation of gear 19 positioning lever 46 is returned to its normal raised position, the trip bar 79 is returned to its normal inner position, and rotation of gear 19 is stopped upon completion of one revolution thereof, as previously described and in the same manner as in the reproduction of twelve inch records.

When it is desired to reproduce 7" records a stack thereof is placed upon spindle 3. With the parts in their normal positions shown in FIGURE 12, the outer end of the positioning lever 46 is in ts fully raised position and disposed to be contacted by shoulder 33, which may be termed the seven inch shoulder, of positioning plate 25. Operation is initiated as before, the bottom record of the stack drops upon the turntable 2, the tone arm swings inward and is set down on the record in proper position, determined by contact of shoulder 33 of flange 30 with lever 46, the remainder of the operation being the same as previously described. It is to be noted that a seven inch record does not extend out as far as button 73 of lever 65, as previously stated. Accordingly, there is no drag on lever 65 and the outer end of positioning lever 46 remains latched in raised position by the bell crank 52. During rotation of gear 19 the outer end of lever 46 may be raised slightly but it drops back to its normal raised position in which it is held by bell crank 52. Briefly, in reproducing 7" records, the parts remain in their normal positions of FIGURE 12, except for the slight raising and lowering of the outer end of lever 46.

It will be understood that changes in detail may be resorted to without departing from the field and scope of my invention in this application in which the preferred form only of my invention has been disclosed.

I claim:

1. In tone arm set-down control means for phonographs using grooved disc records dropped onto a rotating turntable and in which the inner end of the tone arm is moved inwardly of the record incident to reproduction thereof; record changing mechanism comprising means effective for raising the tone arm and moving it from an inner position to an outer record clearing position responsive to completion of reproduction of a record, means for moving said arm from its said outer position to an inner psition and setting it down on a record in position thereon to initiate reproduction thereof, said last means comprising a plurality of stop elements movable with said arm and effective for positioning said arm correspondingly to the diameter of a selected one of a plurality of records of different diameters, and supplementary means actuated by records of larger diameter than said selected record for enabling the one of said stops corresponding to the diameter of the larger diameter actuating record, said supplementary means including first arm means adapted to project above the plane of the record supporting surface of said turntable and responsive to the rotation of a record of a first diameter larger than said selected record when disposed on said turntable for enabling the stop corresponding to said first larger diameter record, said supplementary means further including second arm means responsive to the lowering of a record of a second diameter larger than said selected record to said turntable for enabling the stop corresponding to said second diameter record.

2. Tone arm set-down control means substantially as defined in claim 1 and in which turntable actuated means is effective for raising the tone arm and moving it to its outer position and for setting it down on the record, and yielding means is effective for moving the tone arm from its outer position inward to its set-down position.

3. Tone arm set-down control means substantially as defined in claim 2 and in which a substantially vertical rotatably mounted shaft is provided, on the upper end of which the outer end of the tone arm is mounted for turning movement with said shaft and for movement relative thereto about a substantially horizontal axis, a lift pin is slidable through said shaft with its upper end disposed below and to contact said arm inwardly thereof beyond said horizontal axis, means is provided for raising and lowering said pin for raising said arm and for setting it down on a record, and means is provided for latching said shaft to said yielding means as said arm reaches its outer position and releasing said shaft from said yielding means as said arm reaches its inward set-down position.

4. Tone arm set-down control means substantially as defined in claim 3 and in which a tone arm locator member is provided and is turnable about and free from said shaft and normally held in predetermined angular relation thereto by yielding means urging said member clockwise, and means is provided for latching said shaft to said locator member as said arm reaches its outer position and releasing said shaft from said locator member as said arm reaches its inward set-down position.

5. Tone arm set-down control means substantially as defined in claim 4 and in which the stop elements are carried by said locator member.

6. Tone arm set-down control means substantially as defined in claim 5 and in which said record changing mechanism includes a stop member actuated by a record dropped onto the turntable and positioned in response to such record to be contacted by the one of said stop elements corresponding to the diameter of said actuating record.

7. Tone arm set-down control means substantially as defined in claim 4 and in which a tone arm plate is provided underlying said locator member and slidable on and turnable with said shaft, the lift pin extends downward beyond said plate and the latter is normally supported in spaced relation to said locator member by yielding means confined between said plate and an abutment on said pin adjacent the lower end thereof, and said locator member and plate are provided with cooperating means for latching them together as said tone arm reaches its outer position and releasing said plate from said locator member as said tone arm reaches its inward set-down position.

8. Tone arm set-down control means substantially as defined in claim 7 and in which a normally retracted slide plate is movable to an outer projected position and an inner retracted position, said slide plate having means cooperating with said pin and locator member and tone arm plate during outward movement of said slide plate and effective for lifting said pin and turning said tone arm plate counterclockwise to substantial parallelism with said locator member, thereby raising said tone arm and turning the latter to its outer record clearing position and latching said tone arm plate to said locator member, said means of said slide plate being also effective during inward movement thereof for lowering said pin and releasing said tone arm plate from said locator member, thereby effecting turning of said tone arm clockwise to set-down position and setting down thereof with subsequent clockwise turning of said tone arm plate independently of said locator member, and means responsive to completion of reproduction of a record effective for moving said slide plate to its projected position and returning it to and retaining it in its retracted position.

9. Tone arm set-down control means substantially as defined in claim 8 and in which the means for moving said slide plate to its projected and retracted positions is actuated by said tone arm plate as the tone arm reaches its innermost position on a record being reproduced.

10. Tone arm set-down control means substantially as defined in claim 9 and in which the means for moving said slide plate to its projected and retracted positions comprises a one-revolution gear driven by the turntable and having an eccentric operating connection to said plate, means is provided actuated by said tone arm plate and effective for establishing driving connection between said gear and the turntable as the tone arm reaches its innermost position on a record being reproduced and means actuated by said slide plate is effective for disabling such driving connection as said gear completes one revolution thereof.

11. Tone arm set-down control means substantially as defined in claim 10 and in which said gear has pin and slot eccentric operating connection to said slide plate and yielding means is provided effective for returning said slide plate to retracted position as the tone arm reaches set-down position.

12. In tone arm set-down control means for phonographs using grooved disc records dropped onto a turntable and in which the inner end of the tone arm is moved inwardly of the record incident to reproduction thereof, and there is record changing mechanism comprising means effective for raising the tone arm and moving it from an inner position to an outer record clearing position responsive to completion of reproduction of a record and means for moving said arm from its said outer position to an inner position and setting it down on a record in position thereon to initiate reproduction thereof, the improvement wherein said last means comprises a plurality of stop elements movable with said arm and effective for selectively positioning said arm corresponding to the diameter of a selected one of a plurality of records of different diameters, and supplementary means actuated by said record delivered to the turntable and effective for enabling the one of said stops corresponding to the diameter of said record, said stop elements constituting blocking means having a plurality of blocking positions for blocking the tone arm in its inward movement, and said supplementary means establishing one of said blocking positions responsive to the rotation of a record on the turntable.

13. In tone arm set-down control means substantially as defined in claim 12 and in which said blocking means has a first blocking position preparatory to dropping of a record onto the turntable and the means responsive to rotation of the dropped record establishes a different blocking position of said blocking means.

14. In tone arm set-down control means substantially as defined in claim 13 and in which the blocking position of said blocking means rendered effective by a record rotating on the turntable is rendered ineffective by a record of a different diameter dropped onto the turntable and the blocking position of said blocking means corresponding to the diameter of the latter record is rendered effective thereby.

References Cited

UNITED STATES PATENTS

| | | | |
|---|---|---|---|
| 2,989,312 | 6/1961 | Vistain | 274—10 |
| 2,794,647 | 6/1957 | Guest | 274—10 |
| 3,231,282 | 1/1966 | Dennis | 274—10 |
| 3,321,205 | 5/1967 | Dennis | 274—10 |

HARRY N. HAROIAN, Primary Examiner